US011640251B2

(12) United States Patent
Benisty et al.

(10) Patent No.: US 11,640,251 B2
(45) Date of Patent: May 2, 2023

(54) EARLY TRANSITION TO LOW POWER MODE FOR DATA STORAGE DEVICES

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 56 days.

(21) Appl. No.: 17/185,791

(22) Filed: Feb. 25, 2021

(65) Prior Publication Data

US 2022/0229566 A1 Jul. 21, 2022

Related U.S. Application Data

(60) Provisional application No. 63/139,620, filed on Jan. 20, 2021.

(51) Int. Cl.
*G06F 3/06* (2006.01)

(52) U.S. Cl.
CPC .......... *G06F 3/0625* (2013.01); *G06F 3/0629* (2013.01); *G06F 3/0634* (2013.01); *G06F 3/0653* (2013.01); *G06F 3/0679* (2013.01)

(58) Field of Classification Search
CPC .... G06F 3/0625; G06F 3/0629; G06F 3/0634; G06F 3/0653; G06F 3/0679; G06F 3/068; G06F 3/0673; G06F 1/3287; G06F 1/3275; G06F 1/3228; G06F 1/32; G06F 1/3206; G06F 1/3234; G06F 1/3203; G06F 1/3268; G06F 1/325; G06F 2212/1028; G06F 9/4418; G11C 11/40615; G11C 5/14; G11C 2211/4067
See application file for complete search history.

(56) References Cited

U.S. PATENT DOCUMENTS

| 9,442,668 | B1 * | 9/2016 | Adams ................. G06F 1/3268 |
| 9,547,574 | B2 | 1/2017 | Meir et al. |
| 9,690,364 | B2 | 6/2017 | Park et al. |
| 10,055,236 | B2 | 8/2018 | Erez et al. |
| 2014/0129759 | A1 * | 5/2014 | Sauber ................. G06F 3/0658 |
| | | | 711/E12.008 |

(Continued)

OTHER PUBLICATIONS

NVM Express Base Specification, Jun. 10, 2019, NVM Express, Revision 1.4, pp. 1-403 (Year: 2019).*

*Primary Examiner* — Reginald G Bragdon
*Assistant Examiner* — Curtis James Kortman
(74) *Attorney, Agent, or Firm* — Patterson + Sheridan, LLP; Steven H. VerSteeg (57) ABSTRACT

The present disclosure generally relates to data storage devices, such as solid state drives, and effective power management of the data storage device. The data storage device includes a controller, where the controller is configured to predict when a host device will send a command to enter a low power state, prepare the data storage device to enter the low power state, and receive a command to enter the low power state after the predicting and preparing. If the data storage device is idled for greater than a threshold value, then the data storage device prepares to transition to a low power state but will wait to enter the lower power state until receiving a request from a host device.

15 Claims, 5 Drawing Sheets

(56) References Cited

U.S. PATENT DOCUMENTS

| | | |
|---|---|---|
| 2016/0231797 A1* | 8/2016 | Meir ..................... G06F 3/0625 |
| 2017/0365305 A1* | 12/2017 | Chang ...................... G06F 1/32 |
| 2019/0129636 A1* | 5/2019 | Benisty ................ G06F 3/0634 |
| 2019/0163256 A1 | 5/2019 | Lewis |
| 2019/0286219 A1* | 9/2019 | Anazawa ................ G06F 3/068 |
| 2020/0201417 A1 | 6/2020 | Park et al. |

* cited by examiner

EARLY TRANSITION TO LOW POWER MODE FOR DATA STORAGE DEVICES

CROSS-REFERENCE TO RELATED APPLICATIONS

This application claims benefit of U.S. provisional patent application Ser. No. 63/139,620, filed Jan. 20, 2021, which is herein incorporated by reference.

BACKGROUND OF THE DISCLOSURE

Field of the Disclosure

Embodiments of the present disclosure generally relate to data storage devices, such as solid state drives, and effective power management of the data storage device.

Description of the Related Art

NVMe client storage devices support two mechanisms, autonomous power state transitions (APST) and explicit power change requests issued by the host device, for host device directed power management. However, the data storage device enters a low power state as a response to a host device command. The latency to transition to a low power state is counted from the time the host command is given to enter the low power state to the completion of a power state transition command.

APST provides a mechanism for the host device to configure the controller of the data storage device to automatically transition between power states, based on certain conditions, without software intervention. For example, an entry condition to transition the data storage device to an idle transition power state may be that the controller has been idle for a continuous period of time and has exceeded the idle time prior to transition time specified. The continuous period of time is measured using a timer defined by the NVMe standard, and a host device defines a threshold value for the period of time to be idle. Once the threshold has passed for being idle, the data storage device enters the idle state. The controller is idle when there are no commands outstanding to any input/output (I/O) submission queue. If the controller has an operation in process, such as a data storage device self-test operation, that would cause the controller power to exceed the proposed non-operational power state required power, then the controller may not autonomously transition to the idle transition power state.

The explicit power change requests issued by the host device mechanism includes a designated low power state transition command (i.e., Set Feature command) that is sent by the host device. The host device sends a power transition request to the device and requests a specific power state, based on a power state descriptor table provided by the data storage device. The power state descriptor table includes characteristics such as entry/exit latency, idle and active power, and other features of each power state.

Thus, there is a need in the art to effectively transition to a low power state in response to an explicit power change request by the host device in order to decrease latency.

SUMMARY OF THE DISCLOSURE

The present disclosure generally relates to data storage devices, such as solid state drives, and effective power management of the data storage device. The data storage device includes a controller, where the controller is configured to predict when a host device will send a command to enter a low power state, prepare the data storage device to enter the low power state, and receive a command to enter the low power state after the predicting and preparing. If the data storage device is idled for greater than a threshold value, then the data storage device prepares to transition to a low power state but will wait to enter the lower power state until receiving a request from a host device.

In one embodiment, a data storage device includes a non-volatile memory device and a controller coupled to the non-volatile memory device. The controller is configured to predict when a host device will send a command to enter a low power state, prepare the data storage device to enter the low power state, wherein the preparing is based upon a calculated confidence threshold, and receive a command to enter a low power state after the predicting and preparing.

In another embodiment, a data storage device includes a non-volatile memory device and a controller coupled to the non-volatile memory device. The controller is configured to analyze a history of previous idle timeouts where a host device issued a command for the data storage device to enter a low power state, correlate the previous idle timeouts to other host device signals, calculate a recommended idle time threshold based upon the history and correlation, calculate a confidence level based upon the history and correlation, and determine whether the calculated confidence level is sufficient to trigger an early transition to a low power state.

In another embodiment, a data storage device includes memory means, means to prepare the data storage device to enter a low power state prior to receiving an instruction from a host device to enter the low power state, and means to estimate a confidence of predicting when to enter the low power state, wherein the means to prepare operates based upon the means to estimate, wherein the memory means is coupled to the means to prepare and the means to estimate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives, and effective power management of the data storage device. The data storage device includes a controller, where the controller is configured to predict when a host device will send a command to enter a low power state, prepare the data storage device to enter the low power state, and receive a command to enter the low power state after the predicting and preparing. If the data storage device is idled for greater than a threshold value, then the data storage device prepares to transition to a low power state but will wait to enter the lower power state until receiving a request from a host device. In contrast to APST, usage of a timer is not defined by the NVMe standard, and the data storage device defines the threshold value based upon the history and operation mode of the data storage device. When the time is expired, the data storage device may prepare itself for a low power transition, but will not enter the low power state before getting a host device request.

Figure 1:
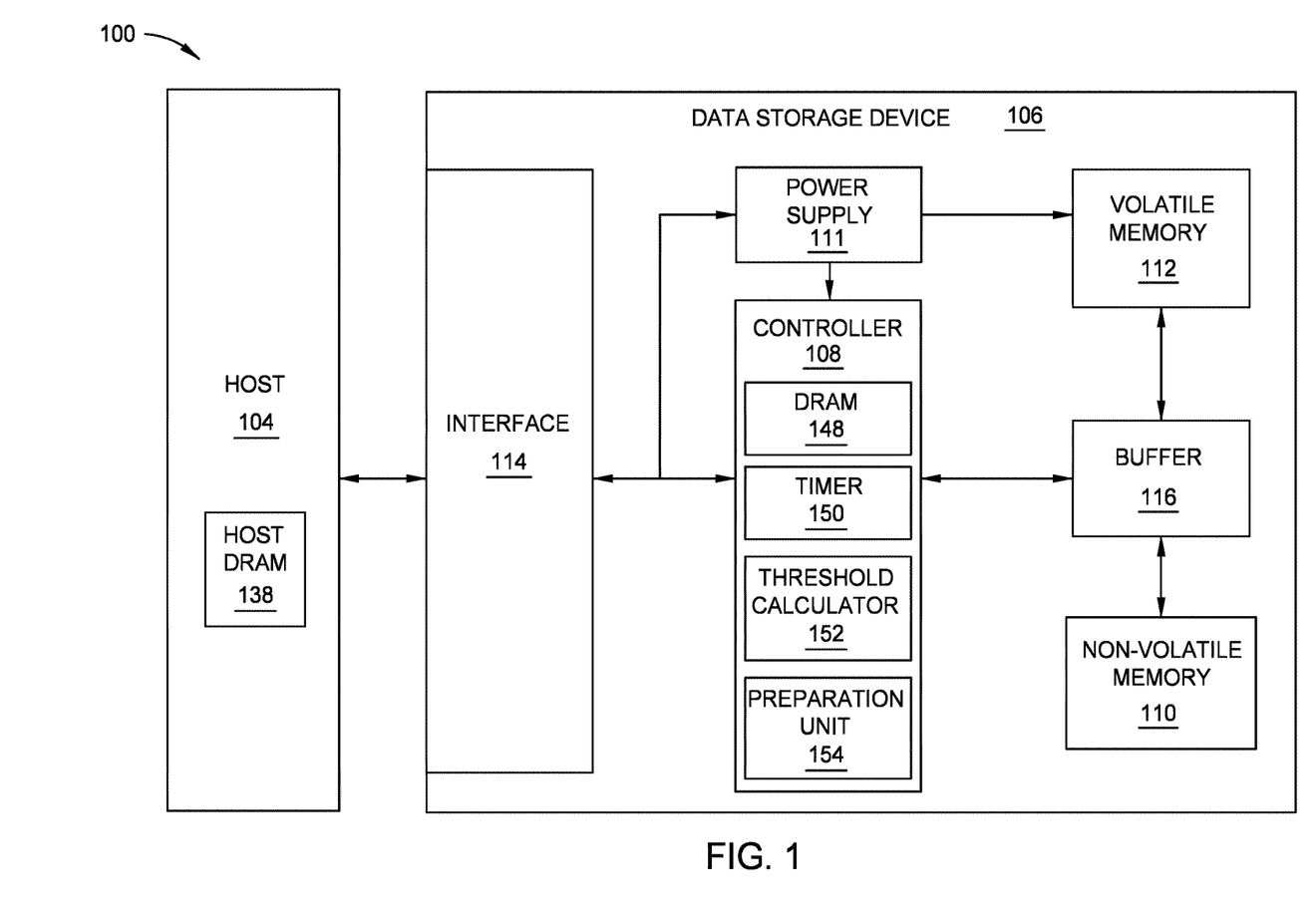
FIG. 1 is a schematic block diagram illustrating a storage system in which data storage device may function as a storage device for a host device, according to certain embodiments.

FIG. 1 is a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM)

devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory or write buffer 116 before sending the data to the NVM 110.

Furthermore, the controller 108 includes a DRAM 148, a timer 150, a threshold calculator 152, and a preparation unit 154. The timer 150 may be utilized to determine a period of time elapsed since the data storage device 106 was last active or has been idle. For example, when the data storage device 106 is executing commands received from the host device 104 the data storage device 106 is considered active. However, while the data storage device 106 is not being utilized from the host device 104 perspective, but is still powered, the data storage device 106 is idled. The threshold calculator 152 determines an idle time threshold. For example, the controller 108 may receive a value for the idle time threshold calculated by the threshold calculated 152 from the previous host device 104 initiated low power entrance request.

Furthermore, the idle time threshold may be affected by whether an alternating current (AC) or direct current (DC) power policy is in effect. The power policy may be detected by looking at the permissive mode settings, such as the Non-Operational Power State Permissive Mode Enable (NOPPME). Permissive mode is typically only enabled on AC power and is disabled when the host device 104 is running on DC power.

When the timer 150 reaches the idle time threshold, the controller 108 may acknowledge an idle timeout and initiate a low power entrance preparation operation. Upon initiating the low power entrance preparation operation or reaching the idle time threshold, the preparation unit 154 may prepare the data storage device to enter a low power state, such that the data storage device 106 will be ready to enter the low power state upon receiving an explicit low power request from the host device 104. For example, the preparation unit 154 may complete at least one of flushing all cached data to the NVM 110, copying the content of all required memories and/or registers to always-on memories, completing all background operations, placing the DRAM 148 in refresh mode, and any other applicable, relevant function. By predicting the idle timeout and preparing the data storage device 106 to enter the low power state before the host device 104 sends the low power state transition request, the data storage device 104 low power state transition latency may be greatly reduced as processes completed after receiving the low power state transition request may be completed in advance to receiving the low power state transition request.

As stated previously, the threshold calculator 152 determines or calculates, or otherwise predicts, the idle time threshold. However, the idle time threshold may require a confidence level, as host device 104 initiated activity may intersect the idle time in such a way as to cancel the host-side low power command after the data storage device 106 has already begun the preparation process. The confidence level may be a scalar value which estimates the level of the idle time threshold determined by the threshold calculator 152. Furthermore, the confidence level may be used to defer some of the activities which have an endurance cost, such as if the confidence level falls below a data storage device 106 determined idle time threshold.

The confidence level may be determined by calculating a similarity measurement between current indications, including host-signals and previous timeouts pattern, utilizing typical values for the idle time threshold, or determining the results of using machine learning models, such as logistic regression, linear-SVM, and the like. The combined measurement of the estimated transition time (i.e., the idle time threshold) and the confidence level estimation provides a non-binary prediction metric, which may allow a trade-off that will minimize the impact of non-accurate prediction events, such as when host device 104 initiated activity intersects the idle time in such a way as to cancel the host-side low power command after the data storage device 106 has already begun the preparation process.

Additionally, the controller 108 may also evaluate the impact of having a miss in the prediction that will cause extra writes to the NVM 110. The evaluation may be performed after the idle time threshold has elapsed, such as when the controller 108 begins preparations to enter the low power state. The evaluation includes determining the current state of the data storage device 106, such as how many cache entries are available and the NVM 110 status. Based on the determined current state and the confidence level, the controller 108 may decide to execute the internal request to enter the low power state.

It is contemplated that the embodiments described herein may be applicable to individual memory arrays of the NVM 110 or to each NVM 110 of a plurality of NVMs.

Figure 2:
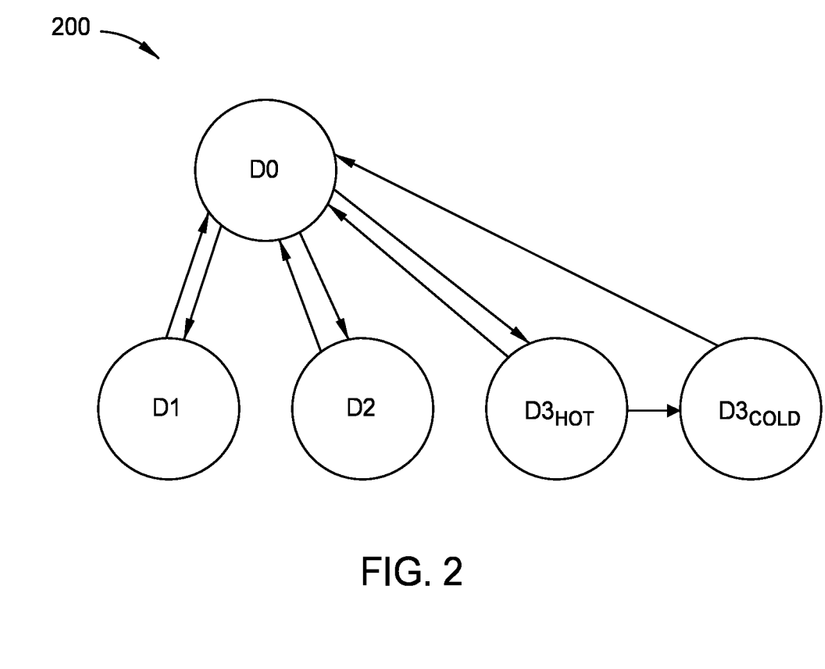
FIG. 2 is a schematic flow diagram of the power states of a data storage device, according to certain embodiments.

FIG. 2 is a schematic flow diagram of a power state diagram 200 of a data storage device, such as the data storage device 106 of FIG. 1, according to certain embodiments. The data storage device 106 operates at various power states, such as D0, D1, D2, D3$_{HOT}$, and D3$_{COLD}$. It is contemplated that other power states, as well as fewer than or greater than the described number of power states, are applicable to the described embodiments. The host, such as the host device 104 of FIG. 1, may provide a suitable amount of power to the data storage device 106 through one or more pins on the interface, such as the interface 114 of FIG. 1.

The suitable amount of power may be more than or equal to the amount of power the data storage device 106 requires to operate. For example, the power a data storage device 106 may receive from the host device 104 may be about 5 W. Furthermore, a data storage device 106 may draw out about 500 mW to about 15 W of power from the host device 104. The previously mentioned values for power are not intended to be limiting, but to provide a reference.

As mentioned previously, the data storage device 106 may have several power states, such as D0, D1, D2, D3$_{HOT}$, and D3$_{COLD}$. Each of the power states are associated with a distinct data storage device 106 operation. The power states are characterized by the following attributes: power consumption, data storage device context, data storage device driver behavior, restore time, and wake-up capability. Power states are numbered sequentially, where higher numbers represent lower power requirements and corresponding higher exit latencies. Furthermore, each power state has an associated power requirement and an exit latency. As shown in FIG. 2, the data storage device may transition from the D0 to either the D1, the D2, or the D3$_{HOT}$ power states. When the data storage device 106 shuts down, the power state of the data storage device exits from D3$_{HOT}$ and enters D3$_{COLD}$.

The D0 power state is considered a fully operational power state, where the data storage device 106 is fully on and operational. An operational power state refers to the ability of a host device 104 to communicate with the data storage device 106 in order to perform input/output (I/O) operations and the data storage device 106 may generate interrupts. Interrupts are an automatic transfer of firmware execution due to a system timer or a user command. The D0 power state has the highest level of continuous power consumption for the data storage device 106. After a period of idle time (e.g., no I/O operations or the like), the host device 104 may instruct the data storage device 106 to enter a low power consumption power state, such as the D1, the D2, and the D3$_{HOT}$ power states. When the data storage device 106 is no longer in use, the host device 104 may instruct the data storage device 106 to enter a non-operational power state D3$_{COLD}$ from the D3$_{HOT}$ power state to limit idle power consumption to a minimal value. In order for I/O commands to occur, the data storage device is woken up from power states D1, D2, D3$_{HOT}$, and D3$_{COLD}$ and placed into power state D0.

Figure 3:
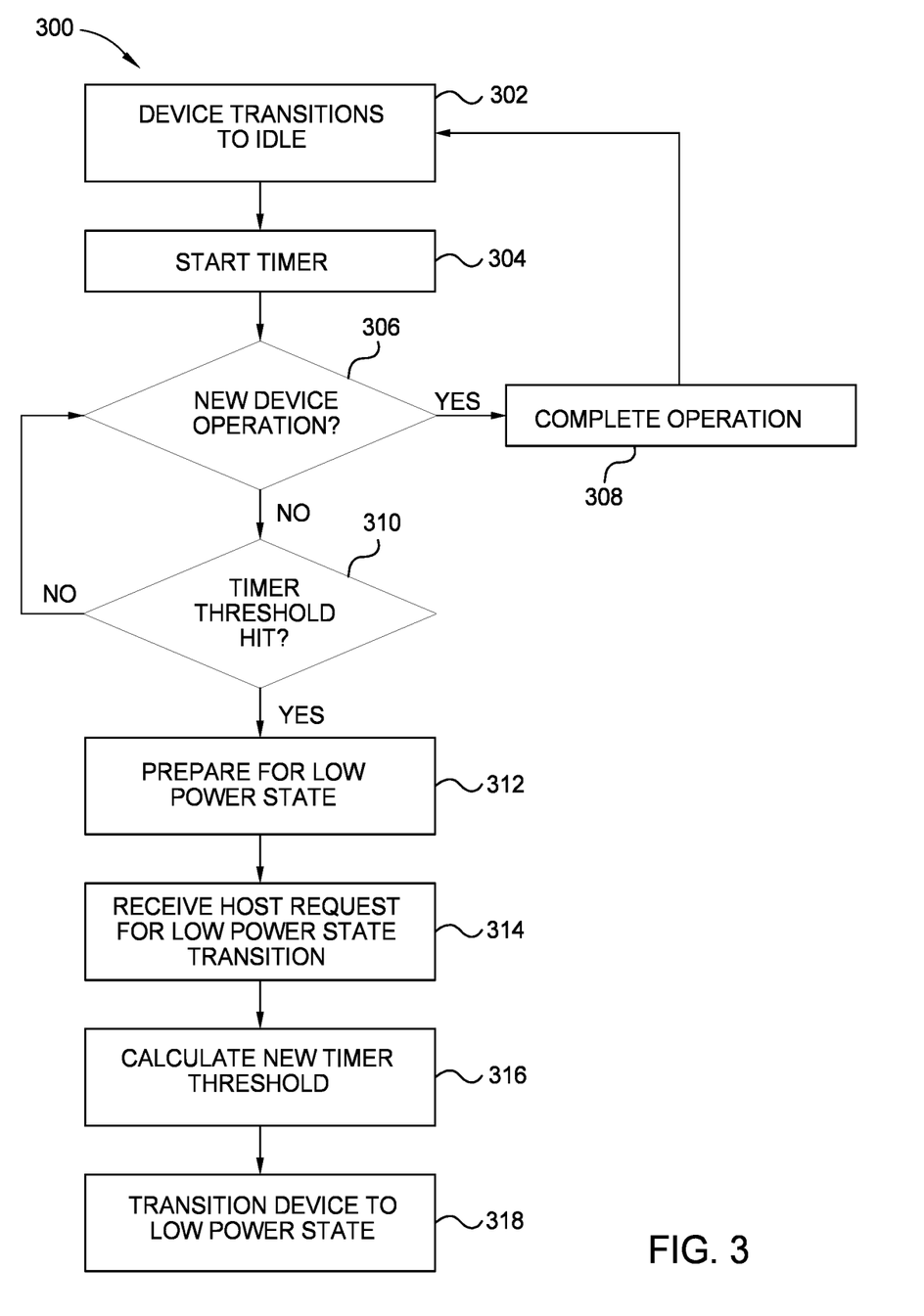
FIG. 3 is a block diagram illustrating a method of transitioning a storage device to a low power state, according to certain embodiments.

FIG. 3 is a block diagram illustrating a method 300 of transitioning a storage device to a low power state, according to certain embodiments. Aspects of the storage system 100 of FIG. 1 may be utilized to describe the embodiments of method 300. At block 302, the data storage device 104 transitions to an idle state from an active state. The active state describes the data storage device 104 working at the D0 power state, where the data storage device 104 is executing read commands, write commands, or similar operations. When the data storage device 104 transitions to idle (i.e., no longer executing read commands, write commands, or similar operations), the timer 150 begins incrementing or counting towards the idle time threshold at block 304.

At block 306, the controller 108 determines if there is a new data storage device 106 operation, such as executing a newly received read operation. If a new operation has arrived or is being executed, then at block 308, the new operation is executed. The method 300 returns to block 302 when the new operation is completed. However, if at block 306, there is not a new data storage device 106 operation, then the controller 108 determines if the idle time threshold has been reached. If idle time threshold has not been reached at block 310, then the method 300 returns to block 306, where the controller determines if there is a new data storage device 106 operation.

However, if the idle time threshold is reached at block 310, then at block 312, the data storage device 106 prepares to enter a low power state, such as either D1, D2, D3$_{HOT}$. Preparing to enter a low power state may include preparation unit 154 completing at least one of flushing all cached data to the NVM 110, copying the content of all required memories and/or registers to always-on memories, completing all background operations, placing the DRAM 148 in refresh mode, and any other applicable, relevant function. At block 314, the data storage device 106 receives a host request to transition to a low power state.

At block 316, a new idle time threshold or a recommended idle period of time is calculated. The new idle time threshold may be calculated by the threshold calculator 152. The new idle time threshold may be calculated by adjusting the idle time threshold by a correction value based on the difference between the when the idle time threshold was reached and when the host device 104 sends the low power state transition request. Furthermore, the new idle time threshold value may be adjusted by previously stated methods, such as machine learning models. At block 318, the data storage device 106 transitions to a low power state after receiving the low power state transition request from the host device 104.

Figure 4:
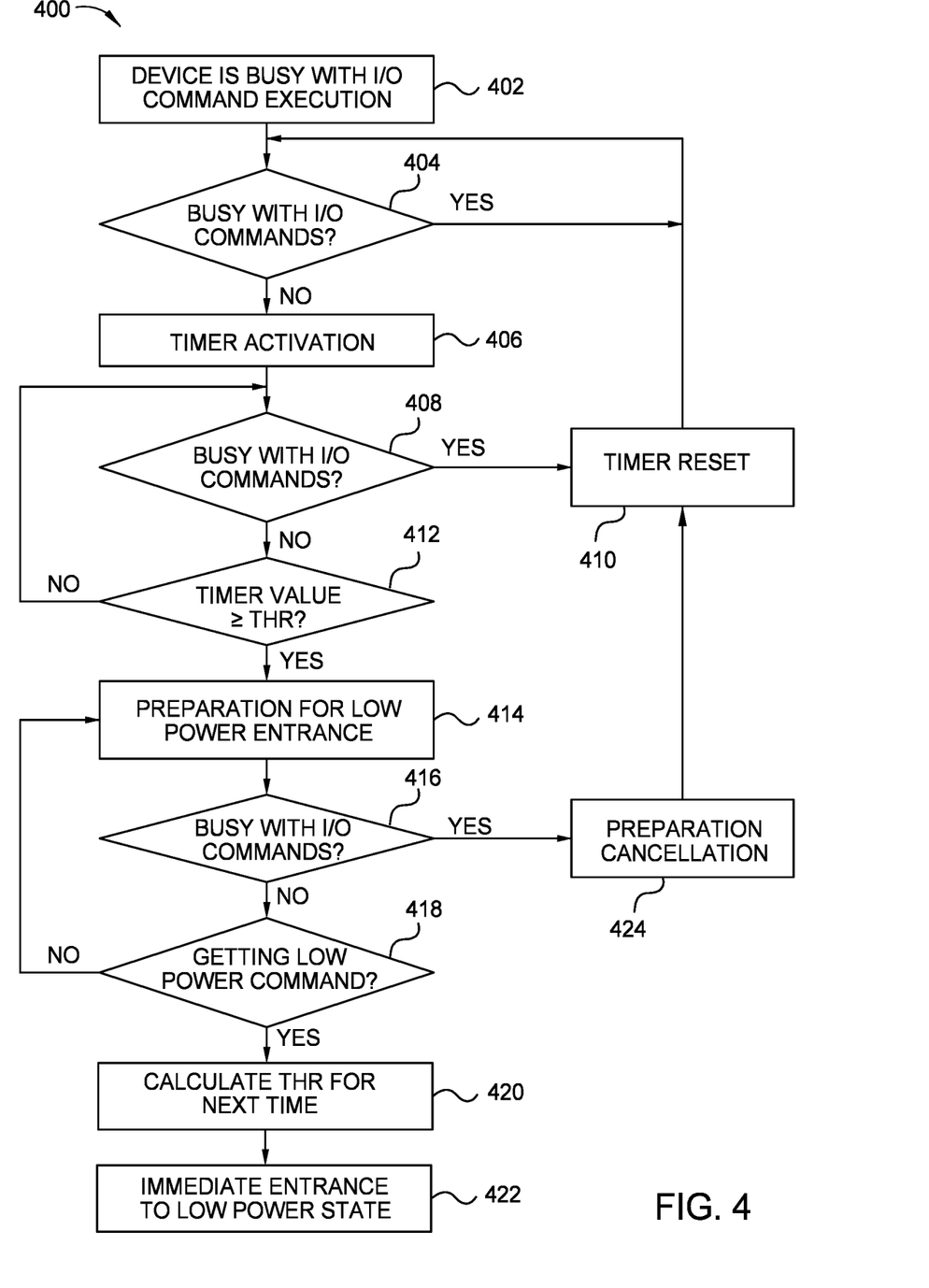
FIG. 4 is a block diagram illustrating a method of an early transition to a low power state mechanism of a data storage device, according to certain embodiments.

FIG. 4 is a block diagram illustrating a method 400 of an early transition to a low power state mechanism of a data storage device, according to certain embodiments. Aspects of the storage system 100 of FIG. 1 may be utilized to describe the embodiments of method 400. At block 402, the data storage device 106 is busy with I/O command execution. At block 404, the controller 108 determines if the data storage device 106 is still busy with the I/O commands. If the data storage device 106 is still busy with the I/O commands, then the method 400 returns to block 404 until the data storage device 106 is no longer busy with I/O commands.

When the data storage device 106 is no longer busy with I/O commands, then at block 406, the timer 150 activates. When the timer 150 activates, the timer 150 begins counting towards the idle time threshold. At block 408, the controller 108 determines if the data storage device 106 is busy with the I/O commands, such as a newly received I/O command. If the data storage device 106 is busy with the I/O commands at block 408, then the timer 150 is reset at block 410 and the method 400 returns to block 404 until the data storage device 106 is no longer busy with I/O commands. However, if the data storage device 106 is still not busy with I/O commands at block 408, then the controller 108 determines if the timer 150 value is greater than or equal to the idle time threshold at block 412.

If the timer 150 value is not greater than or equal to the idle time threshold at block 412, then the method 400 returns to block 408. However, if the timer 150 value is greater than or equal to the idle time threshold at block 412, then the controller 108 utilizes the preparation unit 154 to prepare the data storage device 106 for a low power entrance.

At block 416, the controller 108 determines if the data storage device 106 is busy with the I/O commands, such as a newly received I/O command. If the data storage device 106 is busy with the I/O commands at block 416, then the preparation unit 154 preparation is cancelled at block 424, the timer 150 is reset at block 410, and the method 400 returns to block 404 until the data storage device 106 is no longer busy with I/O commands. However, if the data storage device 106 is still not busy with I/O commands at block 416, then the controller 108 determines if a low power command has been sent by the host device 104 at block 418.

If the low power command has not been sent by the host device 104 at block 418, then the method 400 returns to block 414. However, if the low power command has been sent by the host device 104 at block 418, then at block 420, the threshold calculator 152 calculates a new recommended idle time threshold for a future idle timeout. At block 422, the data storage device 106 enters the low power state.

Figure 5:
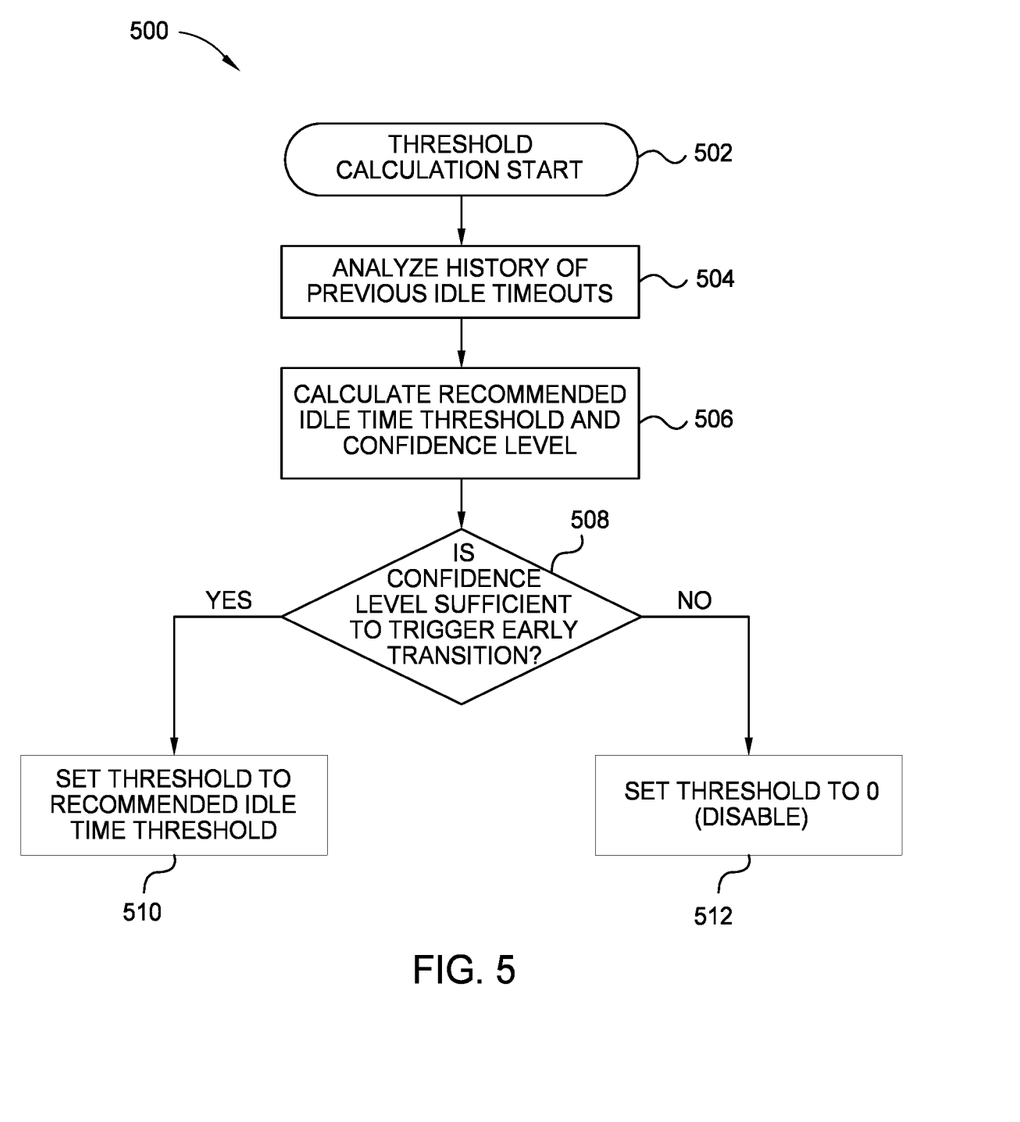
FIG. 5 is a block diagram illustrating a method of updating a timer threshold value, according to certain embodiments.

FIG. 5 is a block diagram illustrating a method 500 of updating a timer threshold value, according to certain embodiments. Aspects of the storage system 100 of FIG. 1 may be utilized to describe the embodiments of method 500. At block 502, the new recommended idle time threshold calculation begins. Block 502 may coincide with block 316 of the method 300 and block 420 of the method 400. At block 504, the history of previous idle timeouts is analyzed. The analyzing may be completed by the threshold calculator 152.

At block 506, the threshold calculator 152 calculates the recommended idle time threshold and a confidence level based on the analyzed history of previous idle timeouts. The confidence level is a value that signifies a level of confidence in the calculated recommended idle time threshold. Furthermore, the recommended idle time threshold may be further calculated by correlating the previous idle timeouts to additional host signals, where the additional host signal may include a non-operational power state permissive mode enable.

At block 508, the controller 108 determines if the confidence level is sufficient to trigger an early transition to a low power state, such as by preparing by the preparation unit 154 the data storage device 106 to enter the low power state upon host device 104 low power state command arrival. For example, the controller ranks the confidence level from 0 to 100. A confidence level of 0 signifies a low confidence and a confidence level of 100 signifies a high confidence. If the confidence level is sufficient enough, such as a confidence level of between about 80 and about 100, then the idle time threshold for the next idle timeout prediction operation is set to the calculated recommended idle time threshold at block 510. A confidence level of about 60 to about 79 may result in the next idle timeout prediction to be considered, however, other factors, such as the data storage device 106 state, may influence the decision. However, if the confidence level is not sufficient to trigger early transition, such as a confidence level of less than 59, then the idle time threshold is set to 0, where 0 indicates that the idle timeout prediction operation is disabled at block 512. The previously listed values are not intended to be limiting, but to provide an example of a possible embodiment. Furthermore, the confidence level may be different for various systems, operations, and platforms that includes the data storage device 106. It is contemplated that after a period of time, a low confidence level may be considered as a high confidence level and a high confidence level may be considered as a low confidence level.

By accurately predicting when the data storage device may receive a low power entrance command from the host device, the latency to enter the low power state is reduced, thus improving the performance of the data storage device.

In one embodiment, a data storage device includes a non-volatile memory device and a controller coupled to the non-volatile memory device. The controller is configured to predict when a host device will send a command to enter a low power state, prepare the data storage device to enter the low power state, wherein the preparing is based upon a calculated confidence threshold, and receive a command to enter a low power state after the predicting and preparing.

The preparing includes flushing all cached data to the non-volatile memory device. The preparing includes copying all content of all required memories and/or registers to the non-volatile memory device. The preparing includes completing all background operations. The preparing includes placing DRAM located in the controller into refresh mode. The predicting includes determining that the data storage device is not busy with input/output commands and activating a timer. The predicting further includes calculating whether the timer has a value that is greater than the calculated confidence threshold. The controller is further configured to recalculate the calculated confidence threshold after receiving the command to enter the low power state. The calculated confidence threshold is calculated by analyzing a history of previous idle timeouts and correlating the previous idle timeouts to additional host signals. An additional host signal includes non-operational power state permissive mode enable. The controller is further configured to calculate a recommended idle time threshold and confidence level and determine if a calculated confidence level is sufficient to trigger an early transition to the lower power state. The controller is configured to place the data storage device into the low power state upon calculating an updated calculated confidence threshold.

In another embodiment, a data storage device includes a non-volatile memory device and a controller coupled to the non-volatile memory device. The controller is configured to analyze a history of previous idle timeouts where a host device issued a command for the data storage device to enter a low power state, correlate the previous idle timeouts to other host device signals, calculate a recommended idle time threshold based upon the history and correlation, calculate a confidence level based upon the history and correlation, and determine whether the calculated confidence level is sufficient to trigger an early transition to a low power state.

The controller is configured to set a low power state threshold to 0 upon determining the confidence level is not sufficient to trigger an early transition to the low power state. The controller is configured to set a low power state threshold to the recommended idle time threshold upon determining the confidence level is sufficient to trigger an early transition to the low power state. The controller is configured to prepare the data storage device to enter the low power state upon determining the calculated confidence level is sufficient to trigger an early transition to the low power state. The preparing includes flushing all cached data to the non-volatile memory device, copying content of all required memories and/or registers to the non-volatile memory, completing all background operations, and placing DRAM that is located in the controller into refresh mode.

In another embodiment, a data storage device includes memory means, means to prepare the data storage device to enter a low power state prior to receiving an instruction from a host device to enter the low power state, and means to estimate a confidence of predicting when to enter the low power state, wherein the means to prepare is operates based upon the means to estimate, wherein the memory means is coupled to the means to prepare and the means to estimate.

The data storage device further includes a timer that is activated when the data storage device is not busy with input or output commands. The means to prepare operates when the timer has a value greater than a value provided by the means to estimate.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a non-volatile memory device; and
   a controller coupled to the non-volatile memory device, wherein the controller is configured to:
   predict when a host device will send a command to enter a low power state, wherein the predicting comprises calculating, based on a history of previous idle time timeouts, a recommended idle time threshold and a calculated confidence threshold;
   prepare the data storage device to enter the low power state, wherein the preparing is based on reaching the recommended idle time threshold and determining that a confidence level for entering the lower power state is greater than or equal to the calculated confidence threshold, wherein the preparing comprises performing one or more low power state transition processes prior to receiving the command to enter the low power state, wherein the one or more low power state transition processes performed prior to receiving the command to enter the low power state comprise at least one of:
   flushing all cached data to the non-volatile memory device;
   copying required content from at least one of a required memory and a register to the non-volatile memory device; and
   placing dynamic random access memory (DRAM) located in the controller into a refresh mode;
   receive the command to enter the low power state after the predicting and the preparing; and
   enter the low power state responsive to receiving the command to enter the low power state.

2. The data storage device of claim 1, wherein the predicting further comprises:
   determining that the data storage device is not busy with input/output commands; and
   activating a timer.

3. The data storage device of claim 2, wherein the predicting further comprises:
   calculating whether the timer has a value that is greater than the calculated confidence threshold.

4. The data storage device of claim 3, wherein the controller is further configured to recalculate the calculated confidence threshold after receiving the command to enter the low power state.

5. The data storage device of claim 1, wherein the calculated confidence threshold is calculated by analyzing the history of previous idle time timeouts and correlating the previous idle time timeouts to additional host signals.

6. The data storage device of claim 5, wherein the additional host signals comprise a non-operational power state permissive mode enable signal.

7. The data storage device of claim 6, wherein the controller is further configured to:
   calculate a recommended idle time threshold and confidence level; and
   determine if a calculated confidence level is sufficient to trigger an early transition to the lower power state.

8. The data storage device of claim 1, wherein the controller is configured to place the data storage device into the low power state upon calculating an updated calculated confidence threshold.

9. A data storage device, comprising:
   a non-volatile memory device; and
   a controller coupled to the non-volatile memory device, wherein the controller is configured to:
   analyze a history of previous idle timeouts where a host device issued a command for the data storage device to enter a low power state;
   correlate the previous idle timeouts to other host device signals;
   calculate a recommended idle time threshold based upon the history and the correlating;
   calculate a confidence level based upon the history and the correlating;
   determine whether the calculated confidence level is sufficient to trigger an early transition to a low power state, wherein triggering the early transition to the low power state comprises performing one or more low power state transition processes prior to receiving the command to enter the low power state; wherein the one or more low power state transition processes performed prior to receiving the command to enter the low power state comprise at least one of:

flushing all cached data to the non-volatile memory device;

copying required content from at least one of a required memory and a register to the non-volatile memory device; and placing dynamic random access memory (DRAM) that is located in the controller into a refresh mode;

receive the command to enter the low power state; and enter the low power state responsive to receiving the command to enter the low power state.

10. The data storage device of claim 9, wherein the controller is configured to set a low power state threshold to 0 upon determining that the calculated confidence level is not sufficient to trigger an early transition to the low power state.

11. The data storage device of claim 9, wherein the controller is configured to set a low power state threshold to the recommended idle time threshold upon determining that the calculated confidence level is sufficient to trigger an early transition to the low power state.

12. The data storage device of claim 9, wherein the controller is configured to perform the one or more low power state transition processes performed prior to receiving the command to enter the low power state upon determining the calculated confidence level is sufficient to trigger the early transition to the low power state.

13. A data storage device, comprising:

memory means;

means to prepare the data storage device to enter a low power state prior to receiving an instruction from a host device to enter the low power state, wherein:

preparing the data storage device is based on reaching a recommended idle time threshold and determining whether a confidence level for entering the lower power state is greater than or equal to a calculated confidence threshold;

the recommended idle time threshold and the calculated confidence threshold are based on a history of idle time timeouts; and preparing the data storage device comprises performing one or more low power state transition processes prior to receiving the instruction to enter the low power state, wherein the one or more low power state transition processes performed prior to receiving the instruction to enter the low power state comprise at least one of:

flushing all cached data to the memory means;

copying required content from at least one of a required memory and a register to the memory means; and placing dynamic random access memory (DRAM) that is located in the controller into a refresh mode;

means to estimate the confidence level for entering the low power state, wherein the means to prepare operates based upon the means to estimate; and means to enter the low power state responsive to receiving the instruction to enter the low power state, wherein the memory means is coupled to the means to prepare, the means to estimate, and the means to enter.

14. The data storage device of claim 13, further comprising a timer that is activated when the data storage device is not busy with input or output commands.

15. The data storage device of claim 14, wherein the means to prepare operates when the timer has a value greater than a value provided by the means to estimate.

* * * * *